United States Patent [19]
Hoffmann

[11] 4,181,555
[45] Jan. 1, 1980

[54] LABELING APPARATUS AND METHOD FOR CONTINUOUSLY SEVERING LABELS FROM CONTINUOUS LABEL STOCK AND APPLYING THE SEVERED LABELS TO CONTAINERS

[75] Inventor: Wolfgang Hoffmann, Modesto, Calif.

[73] Assignee: B & H Manufacturing Company, Inc., Ceres, Calif.

[21] Appl. No.: 875,891

[22] Filed: Feb. 7, 1978

[51] Int. Cl.[2] ........................ B32B 31/00; B26D 5/00; B26D 7/06

[52] U.S. Cl. ........................................ 156/265; 83/98; 83/103; 156/267; 156/353; 156/521

[58] Field of Search ............... 156/256, 264, 265, 267, 156/521, DIG. 33, 519, 517, 353; 83/103, 152, 98

[56] References Cited

U.S. PATENT DOCUMENTS

| | | | |
|---|---|---|---|
| 2,523,153 | 9/1950 | Shapiro | 83/98 |
| 2,543,220 | 2/1951 | Ardell | 156/521 |
| 3,159,521 | 12/1964 | Pechmann | 156/DIG. 33 |
| 3,186,274 | 6/1965 | Winkler et al. | 83/103 |
| 3,749,626 | 7/1973 | Buck | 156/353 |

*Primary Examiner*—Douglas J. Drummond
*Attorney, Agent, or Firm*—Edward B. Gregg

[57] ABSTRACT

Continuous labeling apparatus and method for applying labels to containers of various shapes (cylindrical, oval, etc.) and wherein the labels may be other than rectangular in shape, wherein a continuous label stock which is pre-printed is fed between an anvil roller and a rotary die, labels are severed, scrap material (if continuous) is rewound, each severed label is picked up by a rotary vacuum drum and is supplied to a label applying station where the drum and a container feed come together.

11 Claims, 7 Drawing Figures

10
35
36
37
38
38
39
20
20
16
17
13
15a
15
11
40
41
27
26
42
43
13
13
12
25a
27
27
16
17
19
14
26
13
25
28
18
17
17

LABELING APPARATUS AND METHOD FOR CONTINUOUSLY SEVERING LABELS FROM CONTINUOUS LABEL STOCK AND APPLYING THE SEVERED LABELS TO CONTAINERS

This invention relates to label applying apparatus and method such as the application of wrap around labels to cylindrical containers (metal cans, bottles and the like) wherein one end of a label is adhered to a container by means of glue and is then wrapped around a container and its other end is lapped over the leading end of the label and is attached thereto by glue. The invention, however, is more particularly useful in the application of what are known as "shaped" labels which are applied to only a portion of a container, such labels being, for example, oval, diamond or other shapes, are not rectangular and do not lend themselves well to conventional labeling It is advantageous to supply a user of labels with a roll of pre-printed label stock, to cut labels individually from a continuous feed of label stock and to pick up each cut or severed label on a vacuum drum, then release the label (after application of glue to the leading edge or to the entire surface of the label) to a container at a label applying station. Such an operation provides important economies and conveniences as compared to the application of pre-cut labels, among which are the following: Pre-printed label stock in the form of rolls is much less expensive than pre-cut labels; the packaging, handling and storage of rolls of printed label stock is much easier and less expensive then the packaging, handling and storage of pre-cut labels; and the feed of continuous label stock from a roll to a cutter, thence to a vacuum drum is much less expensive and trouble free than the feed of individual pre-cut labels from a feed magazine.

Heretofore, it has been difficult, if indeed it has been possible, to utilize, in a continuous labeling operation, rolls of label stock with pre-printed shaped labels. Ordinary labels having a uniform rectangular configuration and printed contiguously on label stock can be handled adequately on present day equipment by feeding the label stock from the roll to a cutting instrumentality (which may be a rotary cutter or a reciprocating cutter), severing each label from the next label by a single cut, picking up each severed label on a vacuum drum and rotating the drum continuously so as to cause each label in turn to be presented (usually after application of glue) to a container at which point the vacuum is interrupted and the label is released. The label is adhered to the container by glue applied to the label and/or to the container. The container is caused to rotate about its axis and to wrap the label around the container. Apparatus suitable for such operations is disclosed in Hoffmann U.S. Pat. No. 3,834,963.

However, this facile type of continuous operation is not feasible where the labels are other than rectangular and are so printed on label stock (preferably contiguously) that straight cuts across the label stock suffice. It often happens that the user wishes to apply labels to containers which cannot employ wrap-around labels, for example, oval or square containers and more particularly it is often desired by the label user to apply labels of other than a rectangular configuration, for example, oval, diamond shaped, etc. The practice heretofore has been to pre-cut such labels from continuous printed label stock, usually by guillotine-type cutting instrumentalities, than stack the labels, store them and at the time of use, place them in a magazine for feed, oftentimes by vacuum, to a labeling machine. As will be apparent, such operations and handling are much more tedious, troublesome and expensive than the continuous cutting of labels from label stock where that is possible.

It is an object of the present invention to provide a system, an apparatus and a method of supplying continuous printed label stock, more particularly label stock upon which is printed shaped labels, such label stock being in the form of a roll; to sever the labels from such a stack in a continuous operation; and to apply the severed labels to containers in a continuous manner.

It is a further object of the invention to provide labeling apparatus which employs a rotary cutting die which rotates continuously during normal operation of the machine to sever labels from continuous printed label stock but which automatically and instantly withdraws the cutting die (or its complementary anvil) so as not to act upon scrap material left from the cutting operation.

The above and other objects of the invention will be apparent from the ensuing description and the appended claims.

Certain forms of the invention are illustrated by way of example in the accompanying drawings in which.

Figure 4:
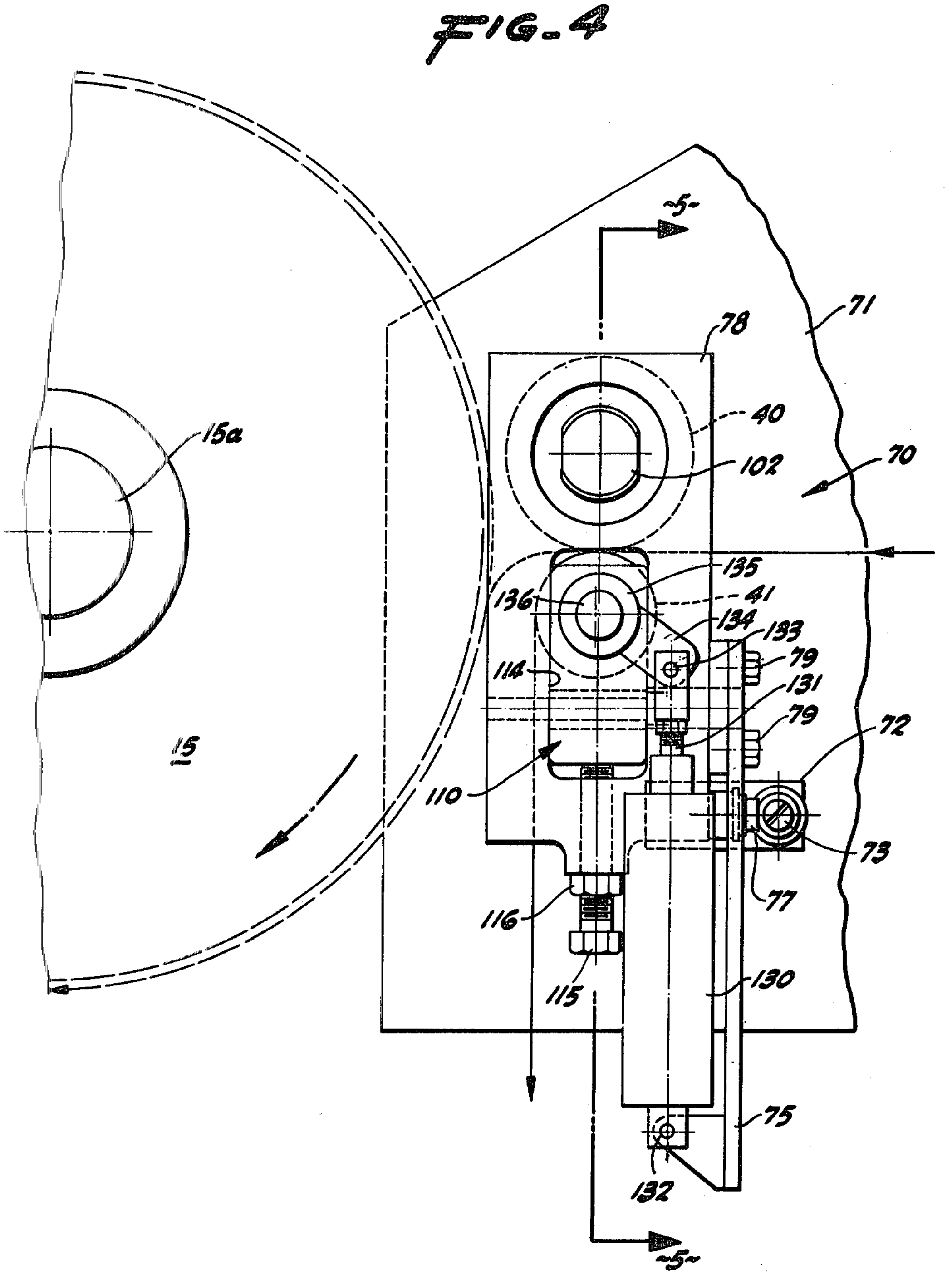
Figure 5:
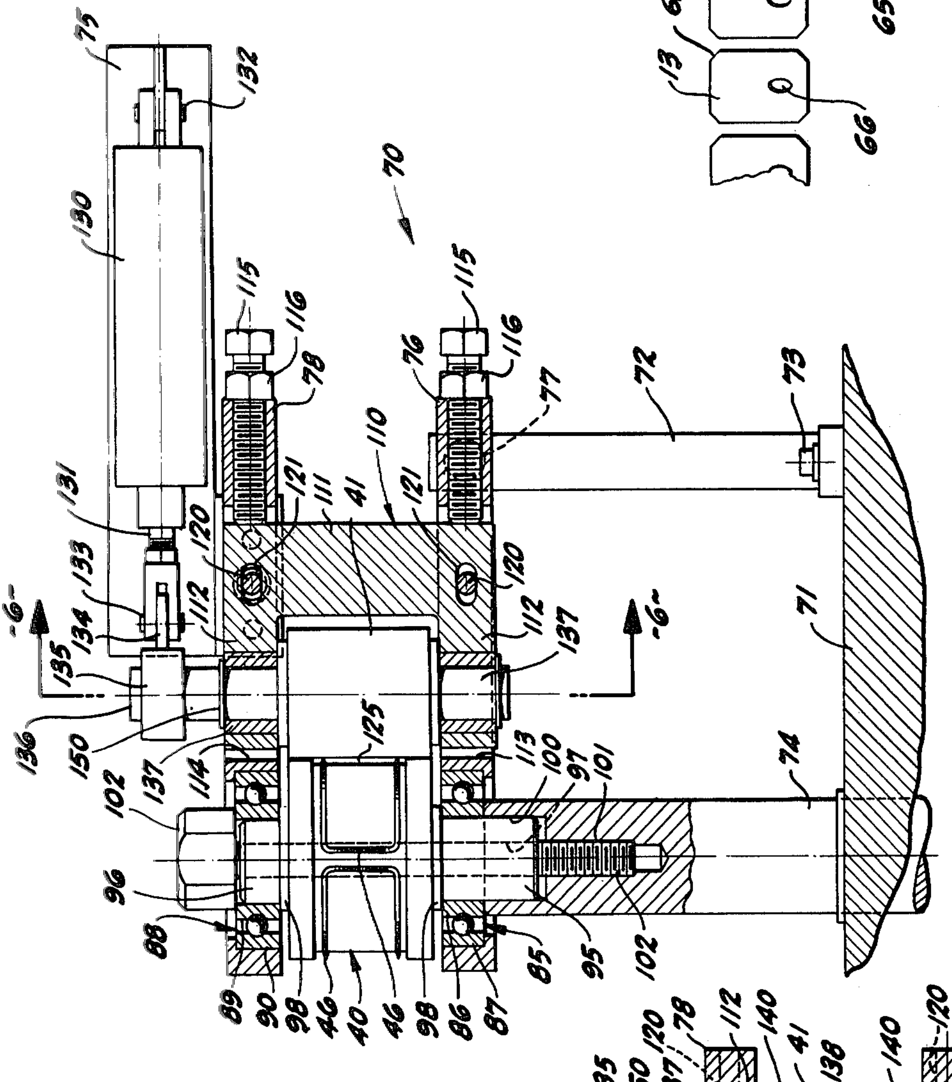
Figure 6:
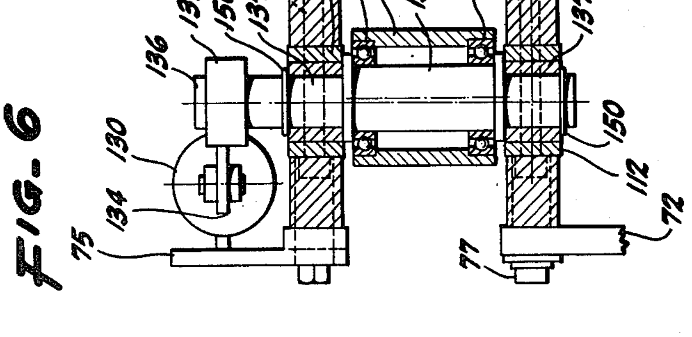

FIG. 4 is a view in end elevation of a label cutting assembly including a rotary cutting die and an anvil roller constructed in accordance with a related patent application filed concurrently herewith, Daniel M. Dickey, Ser. No. 871,554 entitled "ROTARY DIE CUTTING ASSEMBLY FOR CUTTING LABELS";

FIG. 5 is a staggered section taken along the line 5—5 of FIG. 4;

FIG. 6 is a section taken along the line 6—6 of FIG. 5; and

Figure 7:
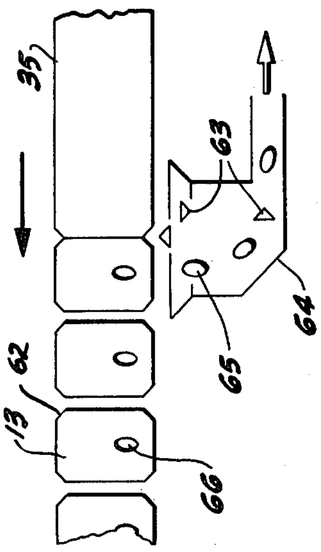

FIG. 7 is a somewhat diagrammatic view showing the manner in which discontinuous scrap is handled.

Figure 1:
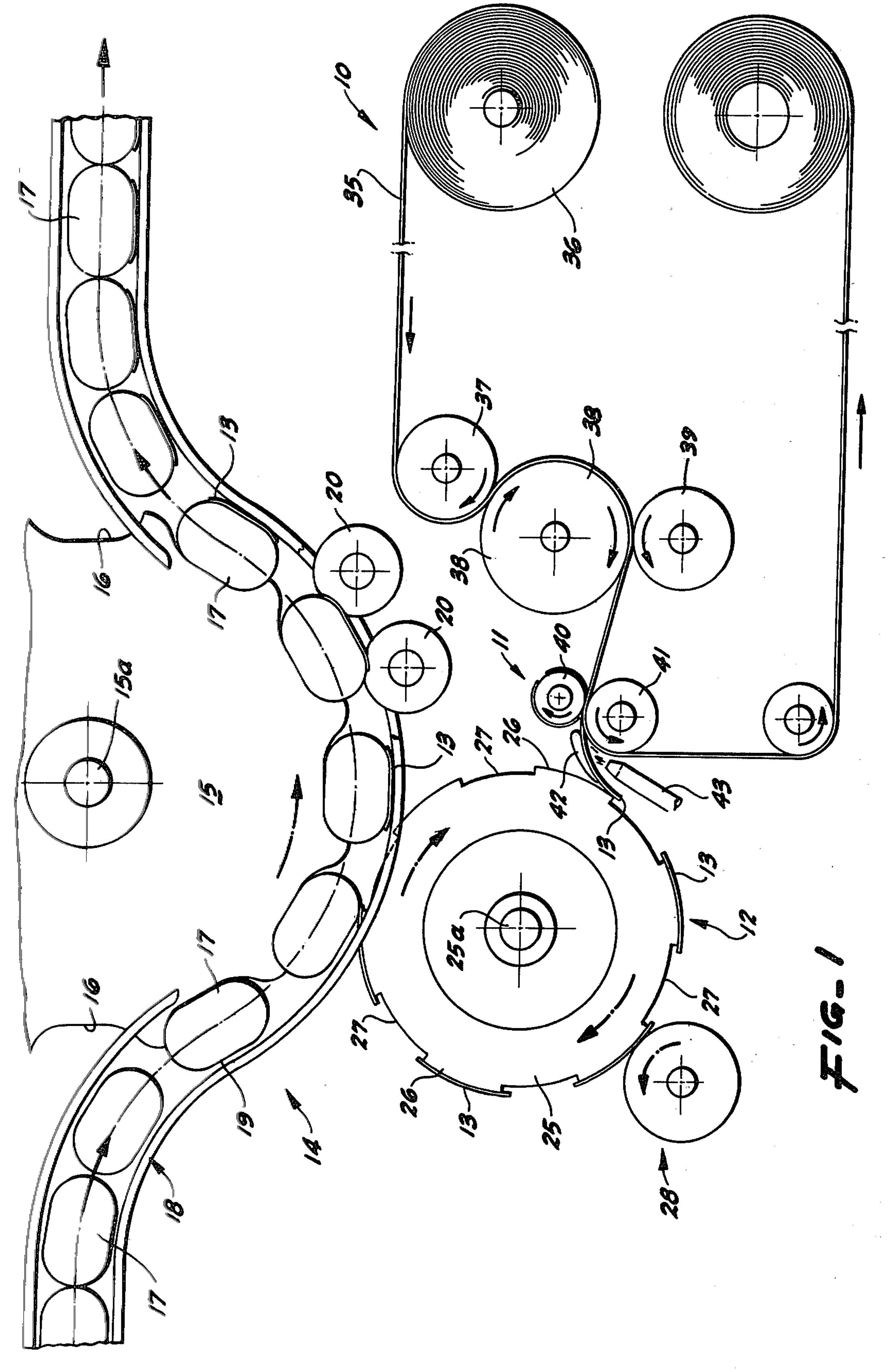
FIG. 1 is somewhat diagrammatic view of an entire labeling apparatus and system in accordance with the present invention.

Referring now first to FIG. 1, the apparatus is generally designated by the reference numeral 10 and it comprises a die cutting assembly 11, a label transfer assembly 12 for transferring severed labels 13 and a container feed generally designated as 14. The container feed comprises in this instance a star wheel 15 rotating with shaft 15*a* and having pockets 16 for reception of containers 17 which are supplied by container feed 18. The containers are shown as being oval, each having a flat side 19 to which a label is to be applied. Also shown downstream from the label applying station are rollers 20 which serve the purpose of smoothing and more securely and evenly sealing a label after it has been applied at the label applying station, which is designated as L.

It will be understood that the shape of the containers may be different from that shown, for example, they may be square or cylindrical or any other shape susceptible of continuous label application. It will also be understood that the container feed may be different than that shown, for example, it may employ a feed screw.

The label transfer assembly 12 is shown as a vacuum drum 25 rotating with a shaft 25*a* and having projecting pads or lands 26 to which the labels 13 are adhered by vacuum, such lands being separated by recessed areas 27. Also shown is a glue applicator 28.

Vacuum drum feeds of this type are well known, for example, those shown in my U.S. Pat. No. 3,834,963.

As is well known in the art, such a vacuum drum is supplied with vacuum means including openings (not shown) in the surface of the drum which attach each label by vacuum when applied thereto by the cutting mechanism, the vacuum being interrupted to release the label at a label applying station L. The glue applicator 28 may be any of several known types such as those shown in one or more of the above-mentioned patent and it may apply glue only to the leading edge, to the leading edge and the trailing edge or to the entire exposed surface of the label. Such apparatus is well known in the art and requires no further description herein.

Continuous label stock 35 is shown which may be drawn from a roll 36 and will ordinarily be pre-printed with labels. However, if desired, a printing unit (not shown) may be installed and synchronized with the labeling applying apparatus 10 to print labels simultaneously with the labeling applying procedure.

This label stock is shown trained about rollers 37, 38 and 39, the roller 38 being the driven roller which pulls the label stock off of the roll 36. The label then passes between a rotary die cutter 40 and an anvil roller 41 and is guided by a guide member 42 to the drum 25. An air nozzle 43 is shown which acts together with the guide 42 to direct the labels accurately to the drum.

Figure 2:
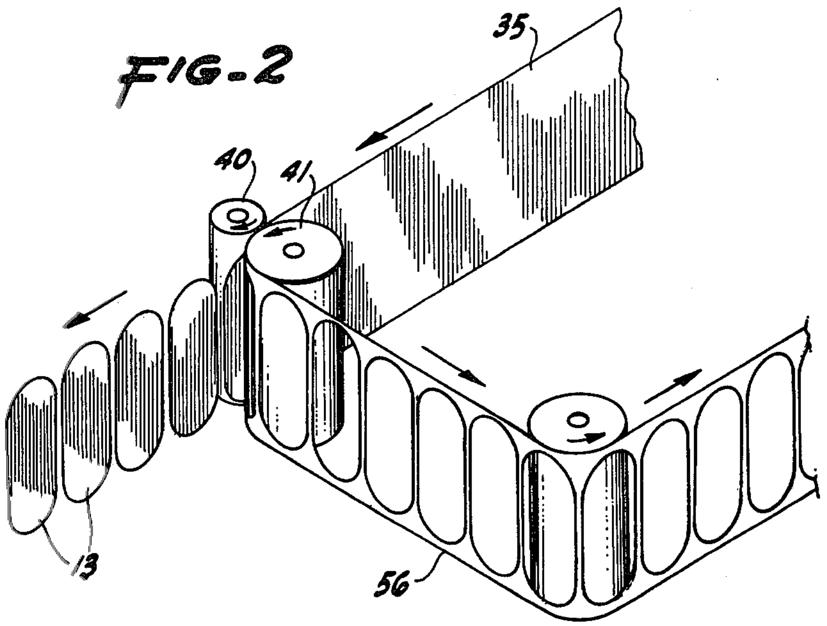
FIG. 2 is a perspective view showing the manner in which labels (oval in this case) are severed from a continuous printed label stock and how continuous scrap material is handled.
Figure 3:
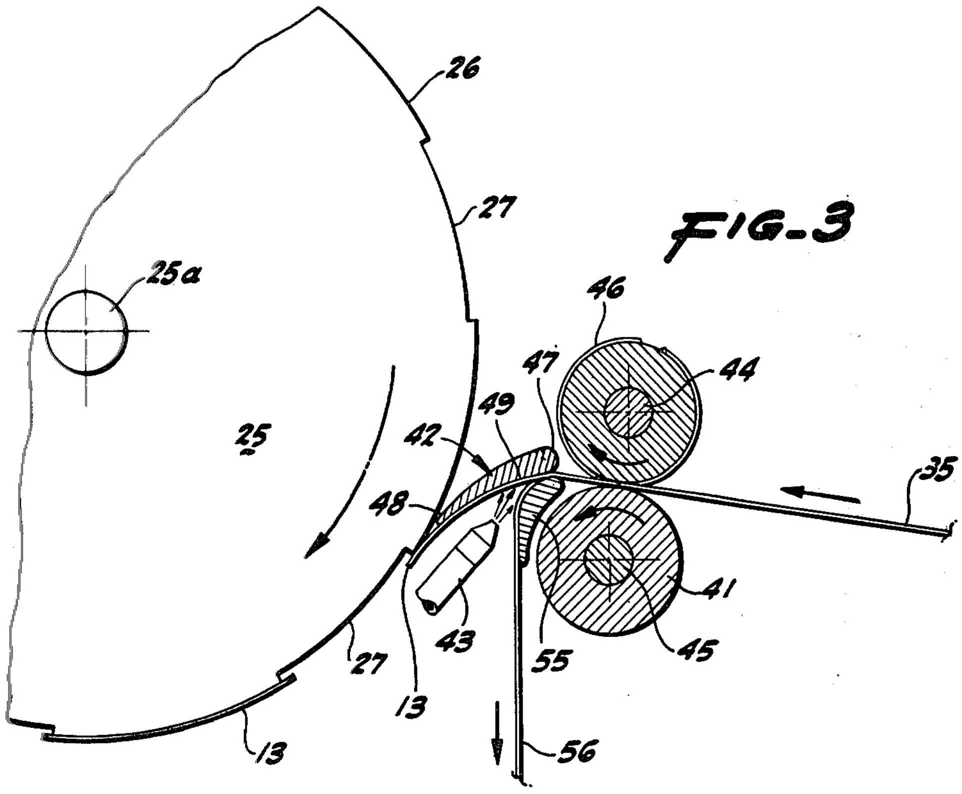
FIG. 3 is a view showing in end elevation the vacuum drum which picks up the labels and showing in transverse cross-section the cutting instrumentalities (a rotary die and a rotary anvil) and showing also means for guiding the severed labels to the vacuum drum and for separating the scrap material from the severed labels.

Referring now to FIG. 3, the rotary die 40 is shown as rotating with a shaft 44 and the anvil roller 41 is shown as rotating on a shaft 45. The shaft 44 is positively driven in timed relation to the remainder of the apparatus. A portion of the knife edge of a typical die is shown at 46, a full profile being shown in FIG. 5. Also shown in FIG. 3 is the guide 42 above mentioned. As will be seen, it has a blunt end 47 and tapers to an edge 48 and has a curvature on its inner surface 49 facing the severed or partially severed label. Also shown is a guide 55 which is located beneath the label and the scrap 56. The end of the guide 55 nearer the die 40 and anvil 41 is curved and has a radius which is smaller than the radius of the anvil 41. As will be apparent, the guide 42 serves to guide the label as it is severed toward one of the pads on the vacuum drum 25. This guidance is assisted by a jet of air from the air nozzle 43. This is particularly helpful where the labels are very limp, for example, certain plastic labels which do not have the stiffness of paper labels. The function and purpose of the guide 55 is to provide a curved guide surface for the scrap 56 having a small radius over which the severed scrap material 56 is pulled. The significance of this is as follows: As a label is severed (even while it is only partially severed from the label stock) and as the scrap material is bent around a radius such as, for example, the radius of the anvil roller 41, there is a natural tendency for the label to proceed in a straight line, i.e. tangent to the anvil roller 41 at its line of contact with the die 40 while the scrap follows the anvil (FIG. 1) or the guide 55 (FIG. 2). This separating or "peeling" function can be performed by the anvil roller alone, as shown in FIG. 1, and it is aided by pulling the scrap around a small radius. If the radius of the anvil 41 is small enough the guide 55 may be dispensed with but if a larger, more massive and larger diameter anvil is used, the guide 55 having a smaller radius is helpful.

Referring now to FIG. 2, a typical operation is there shown. Thus continuous pre-printed label stock 35 is drawn from a roll 36 (see FIG. 1) and is passed between the rotary die 40 and the anvil roller 41, the knife edge of the rotary die being such that it will sever oval labels 13 and leave scrap material 56.

Referring now to FIG. 7, in some instances the severed label extends the full width of the label stock 35 but its corners are beveled or rounded off as shown at 62, thus leaving discontinuous scrap in the form of small pieces 63 rather than as a continuous piece as shown at 56 in FIG. 2. To remove the pieces of scrap 63, a vacuum member 64 is provided to suck the pieces 63 into it and keep them out of the rest of the machine. The rotary die may also be provided with an interior knife edge (not shown) to cut out pieces 65 from the label stock 35 and to form openings 66 in the labels 13, through which the level of product in a transparent container may be viewed.

Referring now to FIGS. 4 and 5, the preferred form of cutting die-anvil roller assembly is illustrated and is designated generally by the reference numeral 70. This assembly comprises the rotary die cutter 40 and the rotary anvil roller 41 referred to above and shown in other figures. In FIG. 5, two knife edges 46 are shown as having a configuration suited to sever labels of the type shown in FIG. 7. It will be understood, however, that there may be only one knife edge on the die cutter or there may be more than two whereby the die cutter 40 severs one, two or more labels during each revolution according to the number of knife edges 46 and it will also be understood that the configuration of the knife edge 46 may be different than that shown. For example, it may be of a shape to sever oval labels as shown in FIG. 2 or it may be in the form of one or more straight knife edges intended to sever contiguous rectangular labels from the label stock.

The assembly 70 is mounted on the frame 71 by a frame bracket 72 bolted to the frame as shown at 73 and a driving shaft 74 which is rotatable in the frame 71. Another frame bracket 75 is also provided having an L-shape and serving to support the outer portion of the assembly 70 and also an air cylinder which is described hereinbelow.

There is provided an inner plate 76 (i.e., inner in the sense that it is closer to the main frame), the left-hand end of which (as viewed in FIG. 5) is supported in a manner described hereinafter by the driving shaft 74. The other end of the plate 76 is supported at one end by the frame bracket 72 to which it is connected by means of a cap screw 77. An outer plate 78 is also provided which is supported by the bracket 75 to which it is connected by screws 79.

For the purpose of rotatably supporting the die cutter roller 40 in the inner plate 76, that plate is fitted with a ball bearing 85 having an inner race 86 and an outer race 87. The plate 78 is also fitted with a ball bearing 88 including an inner race 89 and an outer race 90. The die cutter roller 40 has extensions 95 and 96 and it is formed with an axial passage 97. These extensions are provided with collars 98 to abut the inner races 86 and 89. The extension 95 is fitted into a socket 100 formed in the driving shaft 74 which is also tapped at 101 to receive the threaded end of a cap screw 102.

The anvil roller 41 is mounted in the following manner: A U-shaped bracket 110 is provided having a base portion 111 and spaced arms 112 and it is received in an opening or slot 113 in the plate 76 and 114 in the plate 78 whereby it can be moved forwardly (toward the die cutter roller 40) or rearwardly (away from the die cutter roller). For this purpose, cap screws 115 are provided which are threaded through the ends of the plates 76 and 78 and bear against the base portion 111 of the bracket 110. Lock nuts 116 are provided to lock the screws 115 in adjusted position. Screws 120 are threaded through the plates 76 and 78 and their upper ends are received in slots 121 formed in the base 111 of the bracket 110.

It will be apparent that by loosening the screws 120 and the lock nuts 116 and adjusting the cap screws 115 the bracket 110, therefore the anvil roller 41, may be moved toward or away from the die cutter roller 40 so that the space 125 between the anvil roller and the cutter roller are equal to the height of the knife edge above the cylindrical surface of the die cutter. When suitable adjustment has been made the nuts 116 and screws 120 are tightened to lock the anvil roller in place.

Referring now to FIG. 6 as well as FIGS. 4 and 5, the air cylinder 130 has a rod 131 and is pivotally mounted at 132 on bracket 75. The outer end of rod 121 is pivotally connected at 133 to a lever 134 which is integral with a collar 135 which is fixed to one end of a shaft 136 which is rotatable in bearings 137 mounted in plates 76 and 78. The mid portion 138 of shaft 136 is eccentric to the axis of shaft 136. Anvil roller 41 is mounted on bearings 140 which are concentric to mid portion 138. It will be apparent that on rotation of shaft 136 this eccentric mounting of anvil roller 41 will cause it to shift in relation to the die cutter roller 40.

The air cylinder 130 is connected to a valve (not shown) which is normally (i.e., during normal operation of the apparatus) in a position such as to hold the piston rod 131 in the retracted position shown in FIGS. 4 and 5 whereby the anvil roller 41 is held in the operative position illustrated in FIG. 5 whereby rotation of the die cutter 40 causes labels to be severed. In the event that the apparatus is stopped, e.g., at the end of a shift, or because of a breakdown of the apparatus, or because a container is missing in the container feed, then by control mechanism which is well known in the art label stock feed roller 38 and gate (not shown) which connects the supply of containers to the wheel 15 stop, and are started again in synchronism such that the label about to be severed at the time of stoppage is supplied to the proper pad 26 and the proper container 17 when operation resumes. However, in the meantime the die cutter 40 will continue rotation and its continued rotation during stoppage will (unless the label stock at the junction of the rollers 40 and 41 is withdrawn from the die cutter 40) chew up the label stock between the two rollers 40 and 41. This will cause a container to go by without a label, or it will mangle the label and cause the glue applicator 28 to apply glue to the surface of the drum 25, etc. The control mechanism of the apparatus therefore causes the rod 131 to be extended. This will rotate the shaft 136. The eccentric mounting of the anvil roller 41 will cause that roller to be retracted from the cutter 40. As shown in FIG. 1, the label stock is curved around the anvil roller 41, therefore it will follow the anvil roller and will be retracted from the cutter 40.

An advantage of the assembly 70 is that it is easily mounted on and detached from the frame as a unit, either in its entirety by unscrewing screw 102 and screws 77, or partially by unscrewing screws 102 and the inside screw 120 (which leaves the inner plate 76 intact). By this means the unit 70 can be detached for repairs or replacement.

Although a rotary die cutter is much preferred, a reciprocating cutter, or a rotary shear type of cutter may be used. As indicated, a rotary die cutter is preferred.

It will therefore be apparent that new and useful labeling and label cutting apparatus, system and method have been provided.

I claim:

1. Apparatus for continuously labeling containers with printed labels severed from continuous label stock, including portions lying outside the printed labels, said apparatus comprising:

(a) a container feed for continuous supply of containers to, through and from a label applying station (b) a label transfer means for picking up labels in sequence at a label receiving station and transferring the labels to the label applying station (c) said container feed and transfer means acting to supply labels in sequence to the containers at the label applying station (d) means providing a continuous supply of continuous label stock printed with labels, portions of said label stock being located outside the areas of the printed labels and constituting scrap material and (e) continuously operating label cutting means in the form of a single pair of contiguous, cylindrical, parallel rollers consisting of a driven die roller and an anvil roller, such die roller having formed on its cylindrical surface at least one cutting die which during each revolution of the die roller comes into tangent contact with the anvil roller and with label stock fed between the rollers, the shape and size of the cutting die being such as to sever from the label stock passing between the two rollers a complete label separated from the portion or portions of label stock lying outside the printed labels, said rollers being spaced from and separate from said label transfer means and being so located as to move each label as it is severed away from and out of contact with the two rollers and toward said label transfer means.

2. The apparatus of claim 1 including means to automatically separate the die and anvil when the labeling apparatus is halted.

3. The apparatus of claim 2 wherein said means acts to move the anvil away from the rotary die.

4. The apparatus of claim 3 including also a re-wind means for re-winding continuous scrap resulting from severance of labels from the label stock.

5. The apparatus of claim 3 including vacuum means for removing discrete pieces of scrap resulting from severance of labels.

6. The apparatus of claim 2 wherein the label transfer means is in the form of a rotary vacuum drum.

7. A method of applying non-rectangular labels to containers wherein a continuous container feed is provided and a continuous label transfer means is provided and acts to pick up labels at a label receiving station and apply the labels in sequence to containers at a label applying station, said method comprising (a) providing a supply of continuous label stock printed with labels of non-rectangular shape and having areas of label stock outside the label area, such areas constituting scrap (b) providing a continuously operating cutting instrumentality spaced from said label transfer means and in the form of a pair of parallel, cylindrical, tangent rotary rollers, one of which is an anvil roller and the other is a die roller formed on its cylindrical surface with a knife edge having the shape and size of said label, (c) causing the label stock to pass continuously through the cutting instrumentality (d) continuously severing labels from the label stock by said cutting instrumentality (e) supplying each severed label to said label transfer means and (f) continuously separating and disposing of scrap material resulting from the severance of labels from the label stock.

8. The method of claim 7 wherein the scrap is continuous and is re-wound.

9. The method of claim 7 wherein said scrap is discontinuous and in the form of discrete pieces of label stock and is disposed of by suction means.

10. Apparatus for continuously severing labels from continuous printed label stock wherein portions of the label stock lie outside the label areas and constitute scrap material after labels have been severed, said apparatus also including a rotary vacuum drum for picking up labels at a label receiving station and a container feed supplying containers to a labeling station for transfer of labels from said drum to the containers, said apparatus comprising (a) means for providing a continuous movement of such label stock, (b) a rotary die having a shape and size conforming to the shape and size of the labels, (c) a rotary anvil, (d) said die and anvil being spaced from but close to said vacuum drum and being mounted for rotation about parallel axes and in tangent contact with one another, (e) a guide located in the space between the vacuum drum and the die and anvil, such guide acting to guide severed labels to the drum, (f) and means for removing resulting scrap material.

11. The apparatus of claim 10 wherein there is a scrap guide spaced from the line of tangent contact of the die and the anvil at the exit side thereof which provides a curved surface over which the scrap is drawn, such suface having a radius small enough to promote and facilitate separation of the scrap material from the labels.

* * * * *